A. H. WOOD.
CAR HOISTING AND DUMPING APPARATUS.
APPLICATION FILED SEPT. 23, 1916.

1,301,208.

Patented Apr. 22, 1919.
5 SHEETS—SHEET 1.

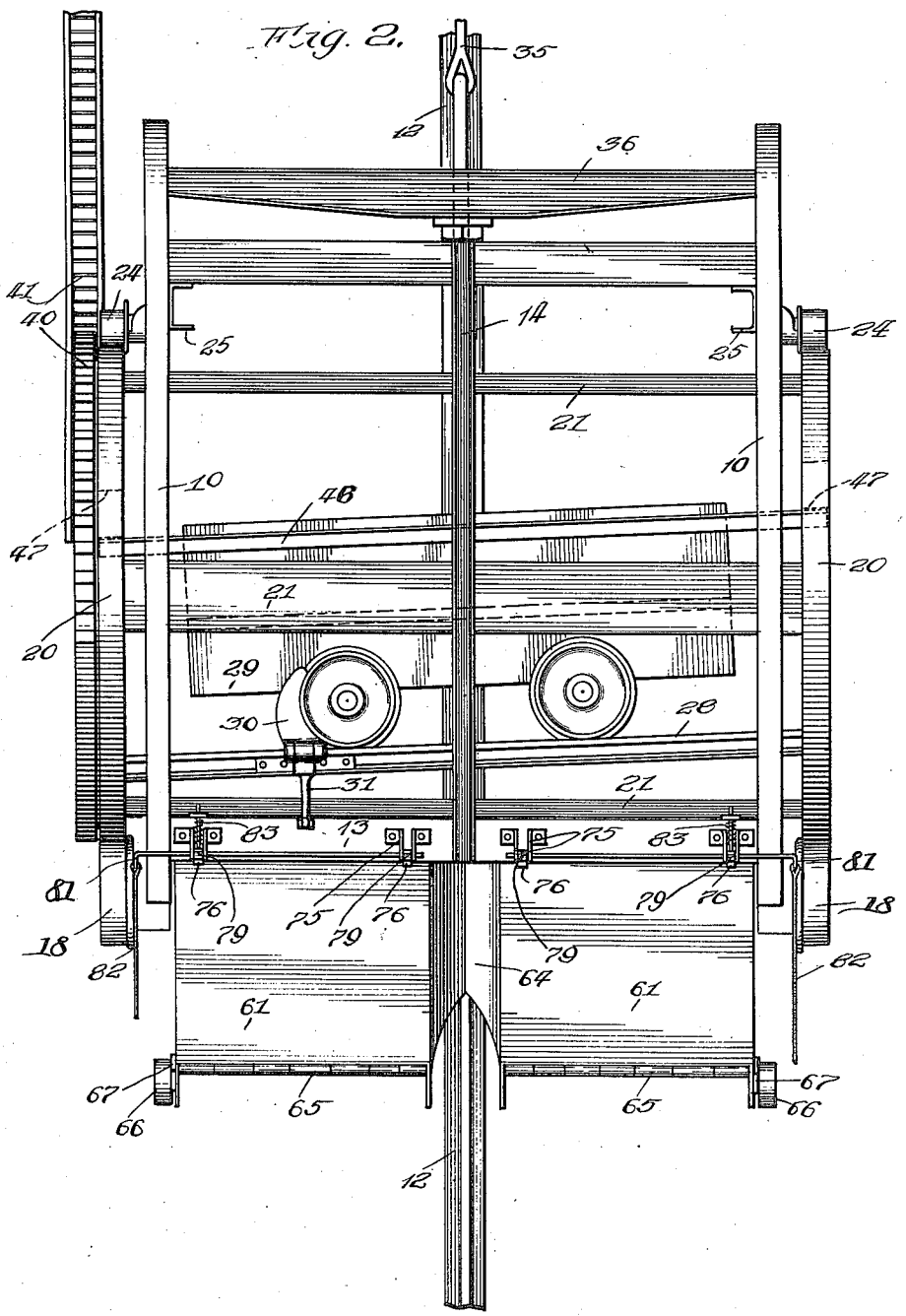

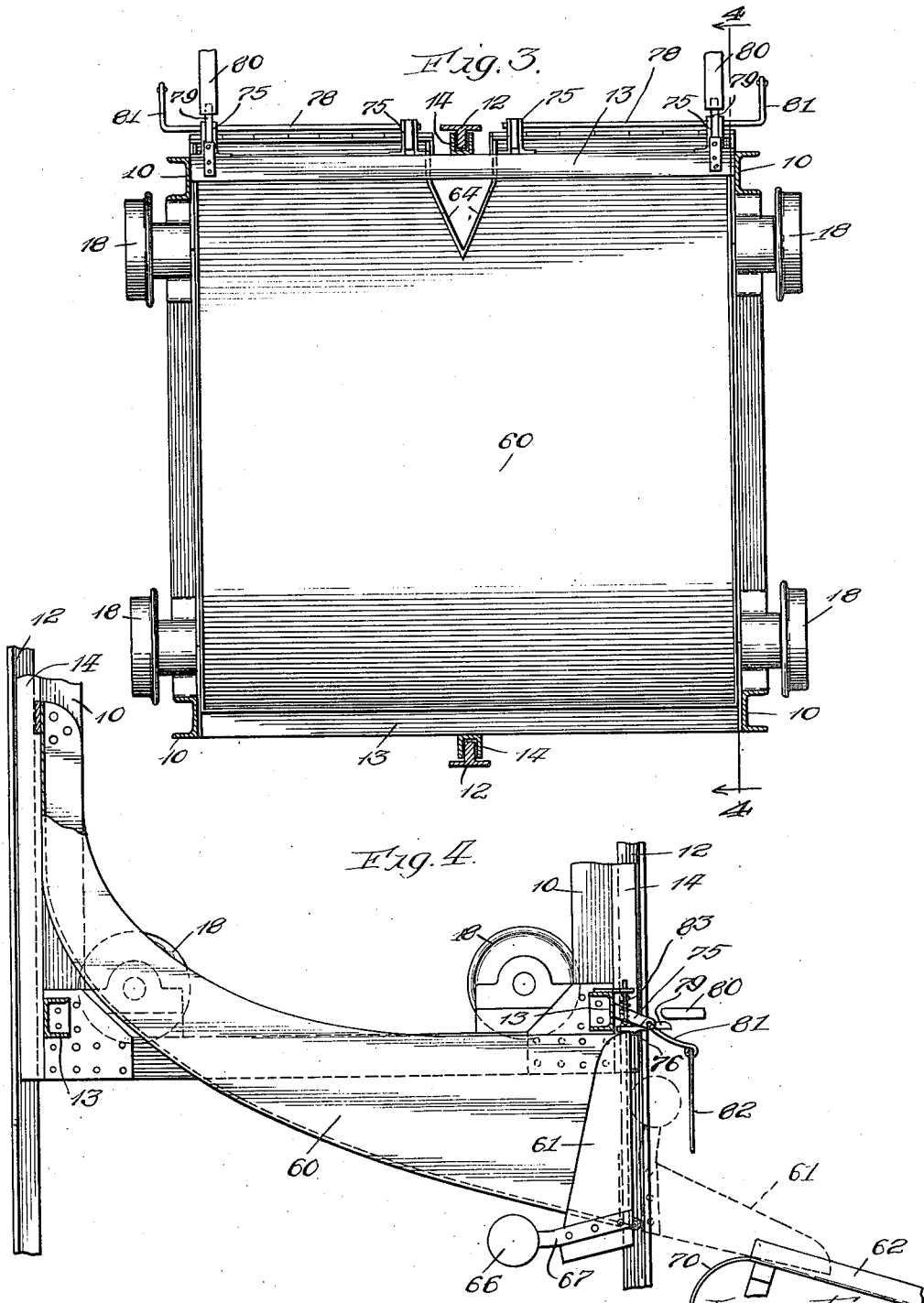

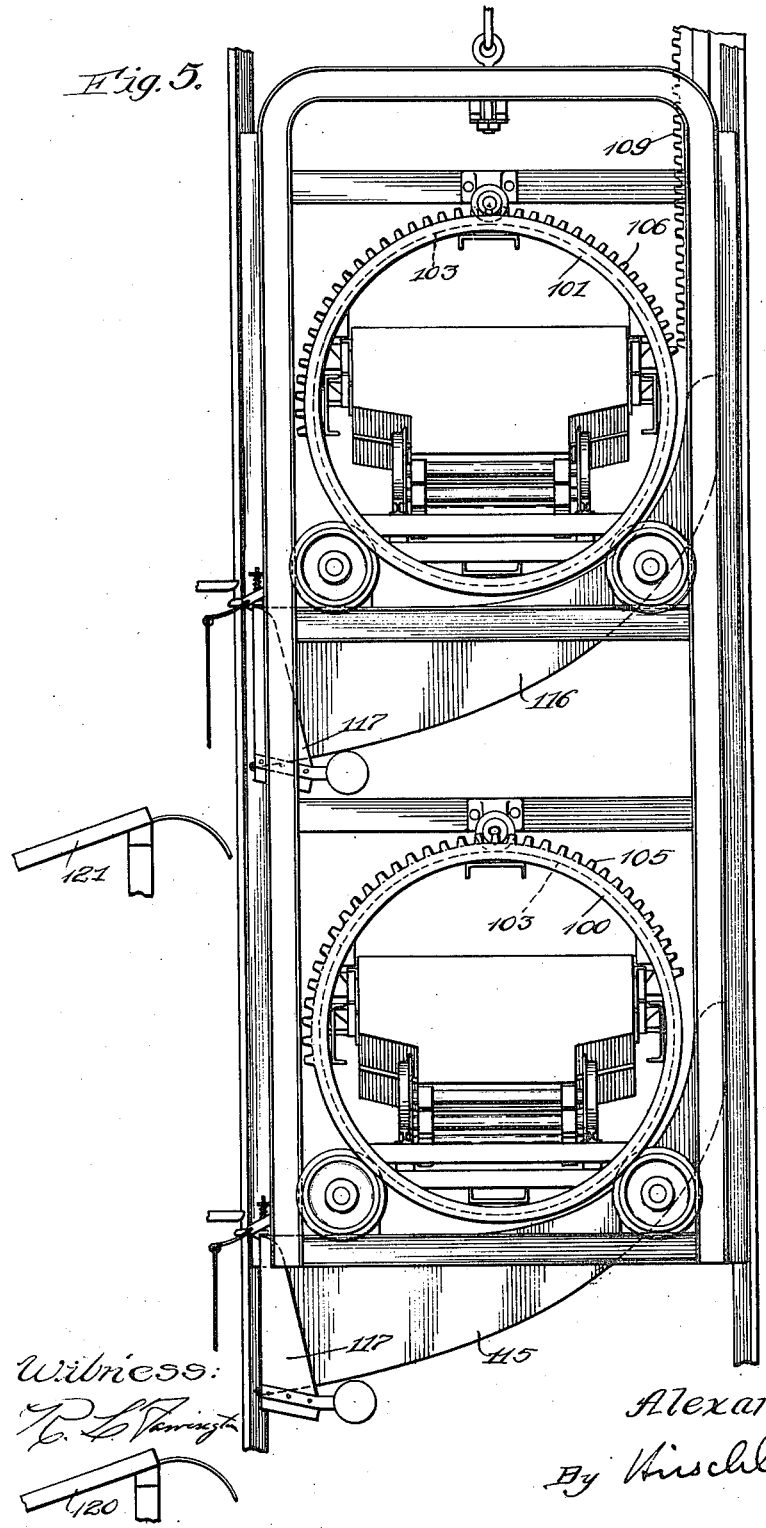

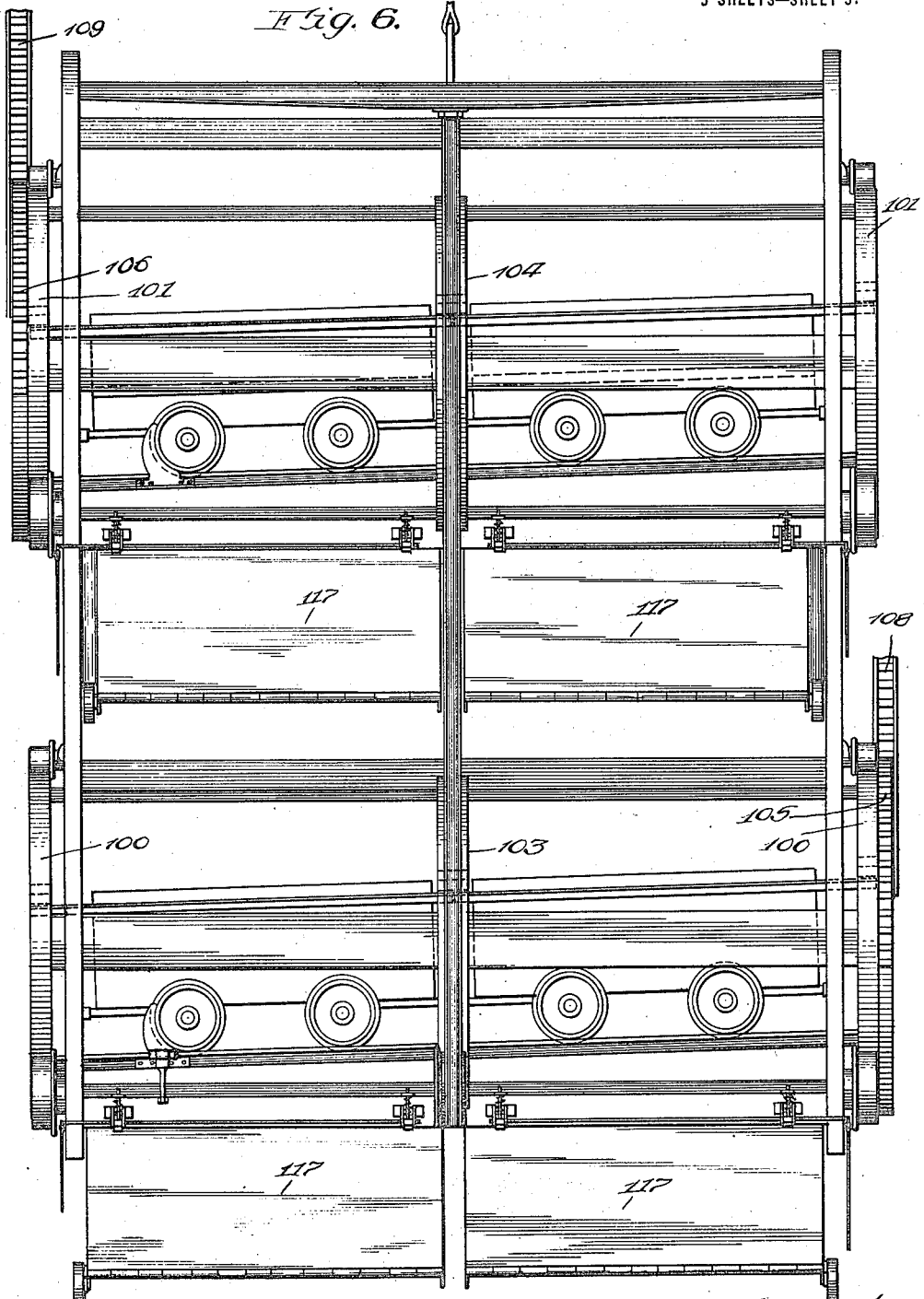

UNITED STATES PATENT OFFICE.

ALEXANDER H. WOOD, OF PETROS, TENNESSEE, ASSIGNOR TO WOOD EQUIPMENT COMPANY, A CORPORATION OF ILLINOIS.

CAR HOISTING AND DUMPING APPARATUS.

1,301,208.  Specification of Letters Patent.  Patented Apr. 22, 1919.

Application filed September 23, 1916. Serial No. 121,809.

*To all whom it may concern:*

Be it known that I, ALEXANDER H. WOOD, a citizen of the United States, residing in the town of Petros, in the county of Morgan and State of Tennessee, have invented new and useful Improvements in Car-Hoisting and Dumping Apparatus, of which the following is a specification.

This invention relates to improvements in hoisting and dumping apparatus designed to elevate a car loaded with coal, ore, or other material and overturn the car at the top of its elevation for the purpose of dumping its contents.

Briefly the apparatus comprises a hoisting cage adapted to receive the loaded car at the foot of a shaft or other loading place and raise it to the top; where the car supporting parts in the cage are engaged in such manner as to rotate them and overturn the car in order to empty it of its load.

An apparatus embodying the principles of the invention is illustrated in the accompanying drawings in which:

Fig. 2 is a similar view showing the cage in side elevation.

Fig. 3 is a horizontal section on the line 3—3 of Fig. 1.

Fig. 4 is a view in transverse vertical section showing the lower part of the cage, such section being taken on the line 4—4 of Fig. 3.

Fig. 5 is a view in end elevation showing a modified form of the improved hoisting cage designed to carry four cars at the same time.

Fig. 6 is a similar view showing the modified form of cage in side elevation.

Figure 1:
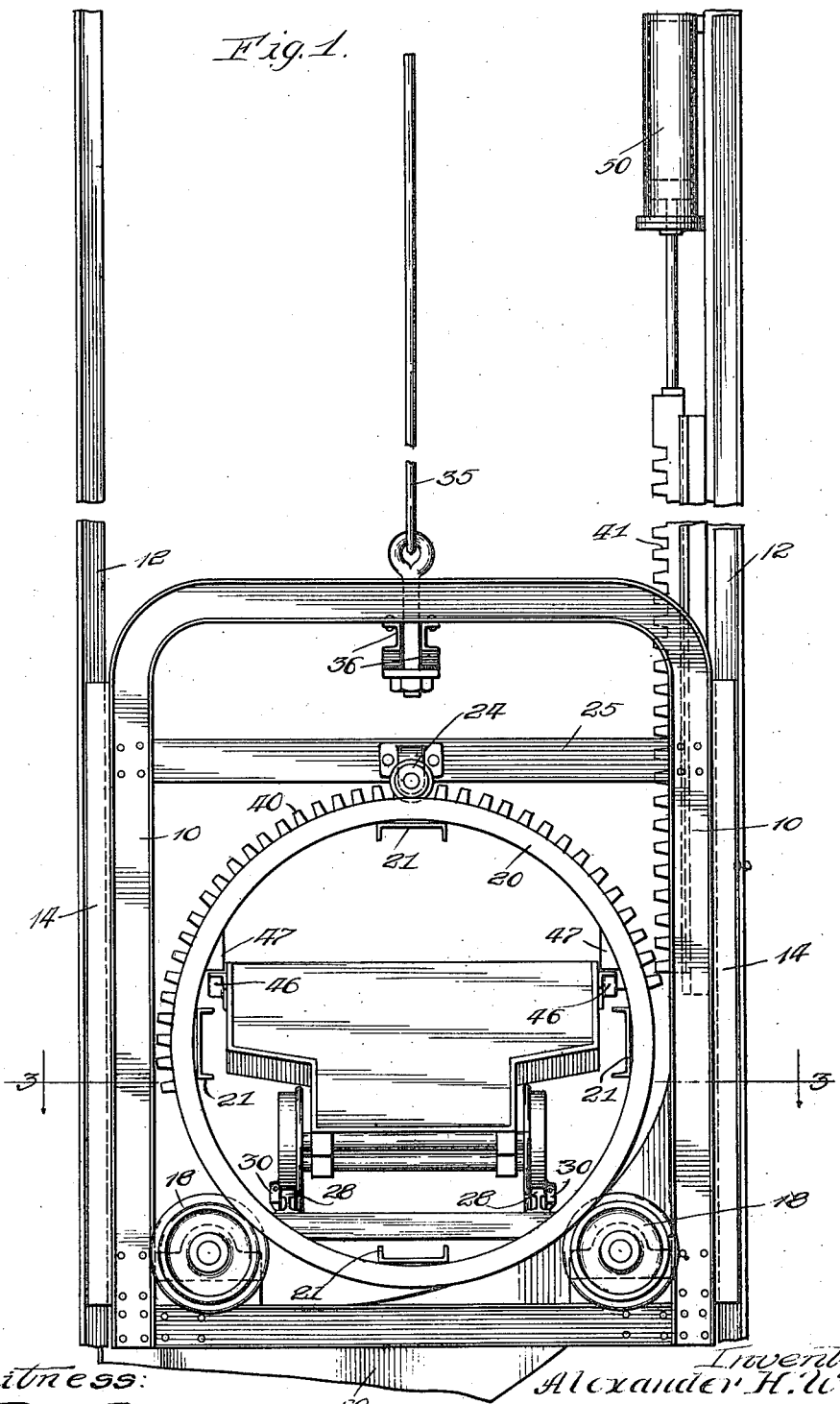
Figure 1 is a view showing the improved hoisting cage in end elevation.

As shown in said drawings in Figs. 1 to 4 inclusive, 10—10 indicate the main structural members of a hoisting cage of the general type found in coal mines and other places for hoisting loaded cars to the surface of the ground, the cage traveling in a shaft with guide rails 12—12 at each side to keep the cage straight in its travel. The structural members 10 are connected by horizontal members 13 to which are secured vertical channel members 14 engaging the rails 12; these particular details of construction of the frame work of the cage constituting no part of the present invention.

Within the cage are journaled four flanged wheels 18, 18, arranged in two pairs, one pair being mounted in the lower part of the forward end of the cage with the two wheels in the same transverse plane, and the other pair being mounted in axial alinement with the first pair and in the rear part of the cage. On each pair of wheels rests a large ring 20; the two rings being connected together by horizontal framing members 21, 21 to form a cylindric car supporting frame work within the cage and designed to rotate about its horizontal axis. The two rings 20 are held down upon their supporting wheels 18 by two smaller wheels 24 above them, one of these wheels being shown in Fig. 1 journaled upon a small bracket secured to a horizontal frame member 25 which latter is joined at its ends to two of the structural members 10.

In the lower parts of the two large rings 20 are laid track rails 28 which extend from one ring to the other through the length of the cage and are somewhat inclined from end to end so that a car, 29, which is placed on them will rest against stops 30 secured to the rails near their lower ends to keep the car from rolling out of the cage. The stops 30 are shown as hinged to the rails so that they may be displaced laterally to permit the empty car to roll forward out of the cage on the return of the latter to the bottom of the shaft; the swinging movement of the stops being controlled through a vertical arm 31. The car-releasing mechanism may be designed to work automatically when the cage reaches the bottom of the shaft, and may be made in any well known form; the particular design and construction of this part of the mechanism constituting no part of the present invention.

The cage is hoisted through a rope or cable 35 secured to a pair of horizontal beams 36 joined at their ends to the structural members 10, and it is designed that at a predetermined elevation in the hoisting, gear teeth on a gear ring 40 secured to one of the large rings 20 shall come into engagement with a stationary rack 41 secured to the side of the shaft, so that during the further upward movement of the cage through a short distance the rings will be rotated to overturn the car; while the latter is confined within its rotating support and kept on its rails by means of projections 46 from the sides of the car which engage under ledges 47 fixed to the two rings.

In order to lessen the shocks incident to the engagement and meshing of the gear teeth with the stationary rack in the upward movement of the cage, the rack is so mounted in the shaft as to permit of some upward movement against the resistance of an air cylinder 50 made in any convenient form, so that by the endwise displacement of the rack the shocks will be cushioned.

Below the open floor of the cage is fixed a curved chute 60 arranged to catch the contents of the car when the latter is overturned; and hinged to the lowest edge of this chute are two swinging aprons 61, 61 which are designed to drop downward into a position as indicated by the dotted lines in Fig. 4, when the cage is in its dumping position, and form an extension of the chute 60 to a stationary slide 62 meeting the top of the case chute 60 at the shaft. A part of the case chute 60 at the center of its lowest edge is cut away in order to accommodate the adjacent guide rail 12 as shown in Fig. 3, and the material is prevented from spilling down through this opening by a vertical wall 64 which guides the material into the two aprons 61.

Each apron 61 is hinged to the lowest edge of the chute 60, as indicated at 65, and is counterweighted by a weight 66 at the end of a perpendicular arm 67, so that when the apron is in its extended position as shown by the dotted lines in Fig. 4 the weight will lie outside the vertical plane of the hinge and tend to keep the apron in its extended position; and when the cage starts descending the underside of the apron will be engaged by a curved plate 70 secured to the end of the slide 62 to raise the apron back toward its upright position until the overbalancing effect of the counterweight completes its movement and restores it to the upright position shown in full lines in Fig. 4. In this latter position the two aprons are latched in order to prevent them from accidentally swinging outward and catching in the shaft. For this purpose there are provided latches each comprising a short crank arm 75 adapted to extend over the upper edge of one of the swinging aprons and having a projection 76 on its underside to engage the edge of such apron. As here shown, there are four such latches fixed to two horizontal pivot shafts 78, 78 by the rotation of which the latches are raised to release the apron; and for the purpose of causing such rotation, there is fixed to each rod a radial arm 79 extending outward from the cage. In the upward movement of the cage these latter arms come into engagement with fixed stops 80 near the top of the shaft and thus rotate the pivot rods 78 and raise the latches to release the aprons when the cage has reached the correct position at the upper end of its travel. In addition the pivot rods 78 are provided with crank arms 81 at their outer ends to which are attached ropes 82 by means of which the latches may be raised to release the aprons in case the automatic releasing action should fail for any reason. When the cage starts to descend and the two swinging aprons are restored to their upright position, they will catch under the latches 75 and be again locked, the latches being pressed downward upon them by springs 83.

In Figs. 5 and 6 is shown a form of the device similar in all respects to that above described except that the cage is made high enough and long enough to accommodate four cars at one load, the cars as here shown being arranged in trains of two each and one train being above the other. For this purpose the cage is provided with two car supporting rotating cylindric frames, indicated at 100 and 101, each of them being made substantially in the same manner as above described, except that with the additional length required for two cars in each rotating frame it is preferable to provide three supporting rings instead of two and accordingly there is shown in each rotating car support a center ring 103 and 104 respectively. Gear rings 105 and 106 respectively are secured to the two rotating supports; these being at opposite ends of the cage and meshing with corresponding stationary racks 108 and 109 at opposite ends of the shaft so that each gear ring will mesh with its own rack; and one of the racks is necessarily arranged slightly higher in the shaft than the other. Below each rotating support in the cage is a chute, 115 and 116 respectively, these being provided with hinged aprons, 117 and 118, hinged to their lowest edges in the same manner as above described and adapted to spill the contents of the cars into fixed slides 120 and 121; the parts being so arranged that upon the elevation of the cage toward the top of the shaft the two gear rings will be engaged to overturn the two trains of cars simultaneously during the upward movement of the cage through the last part of its travel.

Although the device is shown in Figs. 5 and 6 as designed to accommodate four cars in two trains one above the other it is evident that the principles of the invention would not be departed from in making the cage still longer to accommodate more than two cars in a train; or in making it higher to accommodate the cars in more than two levels.

I claim:

1. In a car hoisting and dumping apparatus, a cage adapted to receive a loaded car, a rotating car support within such cage, means for hoisting such cage, means acting through the movement of such cage to rotate such car support and overturn the car, a chute carried by such cage below the rotating car support and a movable apron connected to such chute.

2. In a car hoisting and dumping apparatus, a cage adapted to receive a loaded car, a rotating car support within such cage, means for hoisting such cage, means acting through the movement of such cage to rotate such car support and overturn the car, a chute carried by such cage below the rotating car support, a movable apron connected to such chute, means for latching such apron in one of its positions and means for automatically unlatching it when such cage is in position for dumping its car.

3. In a car hoisting and dumping apparatus, a hoisting cage adapted to receive a loaded car, a rotating car support within the cage, means for hoisting the cage, means acting through the movement of the cage to rotate the car support and overturn the car, a chute carried by the cage below the rotating car support, a movable apron connected to the chute and means for automatically latching and unlatching the apron in the movement of the cage.

In witness whereof, I have hereunto subscribed my name this 19th day of September, A. D. 1916.

ALEXANDER H. WOOD.